US009898878B2

(12) United States Patent
Fedronic et al.

(10) Patent No.: US 9,898,878 B2
(45) Date of Patent: *Feb. 20, 2018

(54) ENTRY CONTROL SYSTEM

(71) Applicant: Assa Abloy AB, Stockholm (SE)

(72) Inventors: Dominique Louis Joseph Fedronic, Belmont, CA (US); Wu Wen, Sunnyvale, CA (US)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/485,274

(22) Filed: Apr. 12, 2017

(65) Prior Publication Data

US 2017/0287243 A1   Oct. 5, 2017

Related U.S. Application Data

(63) Continuation of application No. 11/856,549, filed on Sep. 17, 2007, now Pat. No. 9,652,911, which is a
(Continued)

(51) Int. Cl.
*H04L 9/32* (2006.01)
*G07C 9/00* (2006.01)
*H04L 29/06* (2006.01)

(52) U.S. Cl.
CPC ......... *G07C 9/00103* (2013.01); *H04L 63/08* (2013.01); *H04L 63/10* (2013.01)

(58) Field of Classification Search
CPC ............................... H04L 63/10; H04L 63/08
(Continued)

(56) References Cited

U.S. PATENT DOCUMENTS 5,682,142 A * 10/1997 Loosmore ............... G07C 1/10
235/385
5,991,411 A * 11/1999 Kaufman ............ G06Q 20/085
235/379

(Continued)

*Primary Examiner* — Teshome Hailu
(74) *Attorney, Agent, or Firm* — Muirhead and Saturnelli, LLC

(57) ABSTRACT

An integrated security system which seamlessly assimilates with current generation logical security systems. The integrated security system incorporates a security controller having standard network interface capabilities including IEEE 802.x and takes advantage of the convenience and security offered by smart cards and related devices for both physical and logical security purposes. The invention is based on standard remote authentication dial-in service (RADIUS) protocols or TCP/IP using SSL, TLS, PCT or IPsec and stores a shared secret required by the secure communication protocols in a secure access module coupled to the security controller. The security controller is intended to be a networked client or embedded intelligent device controlled remotely by to an authentication server. In another embodiment of the invention one or more life cycle management transactions are performed with the secure access module. These transactions allow for the updating, replacement, deletion and creation of critical security parameters, cryptographic keys, user data and applications used by the secure access module and/or security token. In another embodiment of the invention a security access module associated with the security controller locally performs local authentication transactions which are recorded in a local access list used to update a master access list maintained by the authentication server.

20 Claims, 14 Drawing Sheets

Related U.S. Application Data continuation of application No. 10/740,518, filed on Dec. 22, 2003, now abandoned.

(58) Field of Classification Search
 USPC .......................................................... 713/172
 See application file for complete search history.

(56) References Cited

U.S. PATENT DOCUMENTS

| | | | | |
|---|---|---|---|---|
| 6,038,551 | A * | 3/2000 | Barlow | G06Q 20/105 |
| | | | | 235/380 |
| 6,061,476 | A * | 5/2000 | Nichani | G06K 9/38 |
| | | | | 382/145 |
| 6,175,922 | B1 * | 1/2001 | Wang | G06Q 20/02 |
| | | | | 380/255 |
| 6,748,532 | B1 * | 6/2004 | Digiorgio | G06Q 20/341 |
| | | | | 713/159 |
| 2001/0028227 | A1 * | 10/2001 | Lys | A61N 5/0616 |
| | | | | 315/317 |
| 2002/0095587 | A1 * | 7/2002 | Doyle | G06Q 20/341 |
| | | | | 713/186 |
| 2003/0006879 | A1 * | 1/2003 | Kang | G07C 9/00309 |
| | | | | 340/5.61 |

* cited by examiner

ENTRY CONTROL SYSTEM

This is a continuation of application Ser. No. 10/740,518 filed Dec. 22, 2003, the entire contents of which are hereby incorporated by reference.

The present invention relates generally to a data processing method AND system and more specifically to a wireless communications physical access control system which merges physical and logical access controls using the security features afforded by implementation of security tokens with standardized authentication protocols.

BACKGROUND

Recent world events and increasing global competition have accelerated efforts to merge physical and logical security systems, particularly for large commercial, industrial and governmental enterprises. However, these merger efforts have been significantly hampered by the large installed base of proprietary physical security systems. These priority physical security systems often utilize proprietary networking architectures, communications protocols, databases and file systems which are difficult to integrate into modern networking security systems. An example of a proprietary security system is described in U.S. Pat. No. 5,682,142 to Loosmore, et al. The Loosmore reference discloses an integrated security system which is intended to be operated as a separate standalone security system.

Incompatibilities between the physical and logical security systems frequently leads to serious deficiencies for either or both the physical and logical security systems. In a recently cited example, a human resources database indicated that an employee had been terminated, but the former employee's e-mail and network access still had the former employee shown as active, which would have allowed the former employee logical access to corporate resources. This example is described by D. Smith, in the journal esecure, September 2002; (22) which is herein incorporated by reference. While this example is more illustrative of logical incompatibilities between different organizational databases, it is not difficult for one to imagine a similar situation where a physical access card is retained in an active status due to incompatibilities between physical and logical security systems. This concern is particularly important in sensitive facilities such as airports where a lost, stolen or improperly managed physical access card could allow the hijacking of an aircraft.

Another impediment to the merger of physical and logical security systems is the lack of formal standards developed specifically for physical security systems.

De facto standards are being promulgated by IT professionals who advocate the use of open computer system architectures, standardized networking protocols and standardized database arrangements such as ODBC. An example of an integrated physical and logical security system is described in U.S. Pat. No. 6,233,588 to Marchoili, et al. The Marchoili reference addresses the lack of standardization in centralized physical and logical security systems computing capabilities but does not address the lack of standardization of security controllers which must interact with the security systems.

The lack of standardization in security controllers is still an important impediment to the merger of physical and logical security systems as many security clients still lack standard network interface capabilities. For example, HID Corporation offers an advanced contactless smart card driven door controller MIFARE ® (6055B). The advanced implementation of a contactless smart card provides a convenient and secure medium for use with both physical and logical security systems. However, a major drawback of this security controller is the lack of a standard network interface. Instead, the controller is provided with an RS-232C interface for local connection with a standard personal computer system using. (See HID MIFARE® (6055B) Reference Sheet, MRG-EN-US, Rev. 10-02 which is herein incorporated by reference.)

The RS-232C interface is used to locally load or update a memory cache associated with the security controller with authorized smart card codes using proprietary software and communication protocols running on a personal computer. This arrangement limits scalability, requires that remote security controllers be managed individually and prevents dynamic and centralized changes to be made to authorized smart card codes.

Other security controller vendors do offer standard network interface capabilities but usually incorporate weak static passwords and/or proprietary authentication coding which is less than ideal, particularly in evolving wireless security controller implementations where communications with a centralized security system may be more easily intercepted. In many cases, the security controllers are usually routed to a centralized control panel using a serial link which is then connected to a standard network.

As such, an ideal security controller would include standard network interface capabilities, ensures secure communications with an integrated security system even over wireless telecommunications links, takes advantage of the convenience and security offered by smart cards and seamlessly integrates with current generation logical security systems.

SUMMARY

This invention addresses many of the limitations described above and provides an integrated security system which seamlessly assimilates with current generation logical security systems. The security system incorporates a security controller having standard network interface capabilities and takes advantage of the convenience and security offered by smart cards and related devices for both physical and logical security purposes.

The term critical security parameter as referred to herein incorporate the US National Institute of Standards and Technology (NIST) definition specified in FIDS PUB 140-2, "Security Requirements For Security tokens," and includes authentication data and attributes, passwords, PINs, biometric samples, asymmetric and symmetric cryptographic keys.

The term security token referred to herein include hardware based security devices such as cryptographic modules, smart cards, integrated circuit chip cards, portable data carriers (PDC), personal security devices (PSD), subscriber identification modules (SIM), wireless identification modules (WIM), USB token dongles, identification tokens, secure application modules (SAM), hardware security modules (HSM), secure multi-media token (SMMC), trusted platform computing alliance chips (TPCA) and like devices.

The method portion of the invention comprises establishing a secure communications connection over a network between a security controller and at least an authentication server, operatively coupling a security token to the security controller, sending a critical security parameter from the security token to the security controller for authentication, sending the critical security parameter to the authentication server via the secure communications connection, performing an authentication transaction by the authentication server for the critical security parameter and sending a result of the authentication transaction from the authentication server to the security controller via the secure communications connection.

The final action of the method portion of the invention energizes an electromechanical circuit controlled by the security controller if the result is affiunative of the authentication transaction being successful. The electromechanical circuit is associated with a physical access gateway, where energizing the electromechanical circuit opens the physical access gateway The duration in which the electromechanical circuit is energized may have a pre-established duration specific to the security token. This allows for controlling the opening of a gateway such as a door to accommodate deliveries or allow physically disabled persons to transit the doorway.

The secure communications connection includes a shared secret established between the security controller which is securely maintained by a secure access module operatively coupled to the security controller.

The security controller is one of a plurality of security controllers, all of which are networked clients of the authentication server. In an embodiment of the invention, at least a portion of the secure communications connection is established over a wireless telecommunications link which incorporates a security protocol including SSL, IPsec, PCT, TLS or RADIUS.

In an embodiment of the invention, the security controller is further in secure communications over the network with a life cycle management server. The life cycle management server is adapted to perform life cycle management functions related to applications, critical security parameters or user data installed in either the security token or the secure access module.

In another method embodiment of the invention, the invention comprises establishing a secure communications connection over a network between at least an authentication server and a secure access module associated with a security controller, operatively coupling a security token to the secure access module via an interface coupled to the security controller, sending a critical security parameter from the security token to the secure access module, sending the critical security parameter to the authentication server via the secure communications connection, performing an authentication transaction by the authentication server via a process which incorporates the critical security parameter, sending a result of the authentication transaction from the authentication server to the security controller via the secure communications connection and energizing an electromechanical circuit controlled by the security controller if the result is affirmative of the authentication transaction being successful. Energizing the electromechanical circuit opens a physical access gateway.

In this embodiment of the invention, the secure communications connection incorporates a shared secret which is maintained by the authentication server and the secure access module. As before, the secure communications connection incorporates a security protocol including SSL, IPsec, PCT, TLS or RADIUS.

In another method embodiment of the invention, the invention comprises performing one or more life cycle management transactions with a secure access module coupled to a security controller and a life cycle management by establishing a secure communications connection between a secure access module and at least a life cycle management server and performing one or more life cycle management transactions with the secure access module in conjunction with the at least a life cycle management server. As before, the one or more life cycle management transactions comprises distributing, exchanging, deleting, adding or modifying one or more critical security parameters, applications or user data installed in the secure access module.

In a final method embodiment of the invention, the invention comprises physically controlling access to a protected location by sending one or more critical security parameters from one or more security tokens to a secure access module operatively coupled to a security controller for authentication, performing one or more authentication transactions by the secure access module using the one or more critical security parameters, temporarily maintaining a local access list of the one or more critical security parameters which have been authenticated by the secure access module, sending the local access list to an authentication server, and updating a master access list maintained by the authentication server. In this embodiment of the invention, the local access list is sent over an IEEE 802.x standard network arrangement.

In another method embodiment of the invention, the secure access module is further in secure communications over the network with a life cycle management server. In this embodiment of the invention, the life cycle management server is adapted to perform life cycle management functions related to applications, critical security parameters or user data installed in either the security token or the secure access module.

In one systematic embodiment of the invention, the embodiment includes a security token operatively coupled to a security controller and includes the means for sending a critical security parameter to the security controller for authentication; a secure access module (SAM) is likewise operatively coupled to the security controller and includes the means for securely maintaining a shared secret established by an authentication server and incorporating the shared secret into a secure communications connection established with at least an authentication server.

An electromechanical control means is further likewise operatively coupled to the security controller means and includes the means for opening a physical access gateway when energized.

The security controller includes means for establishing the secure communications connection with the authentication server, sending the critical security parameter to the authentication server via the secure communications connection and energizing the electromechanical control means in response to an affirmative authentication result received from the authentication server; and, The authentication server includes means for establishing the secure communications with the security controller, performing an authentication transaction in response to receiving the critical security parameter from the security controller and supplying the affirmative authentication result to the security controller via the secure communications connection following a successful authentication of the critical security parameter.

In an embodiment of the invention, a portion of the secure communications connection is established over a wireless telecommunications link. As before, the secure communications connection incorporates a security protocol including SSL, IPsec, PCT, TLS or RADIUS.

In another embodiment of the invention, the secure access module further includes means for locally performing the authentication transaction. In this embodiment of the invention, the security controller or the secure access module further includes means for maintaining an access list of locally authenticated critical security parameters and the authentication server further includes means for receiving the access list of locally authenticated critical security parameters and updating a master access associated with the authentication server.

In another embodiment of the invention, a life cycle management server is provided. The life cycle management server includes means for establishing a secure communications connection between either the secure access module or the security, and performing one or more life cycle management transactions with the secure access module in conjunction with the life cycle management server. As before, the one or more life cycle management transactions comprises distributing, exchanging, deleting, adding or modifying one or more critical security parameters, applications or user data installed in the secure access module.

In another systematic embodiment of the invention, the invention comprises a security apparatus for physically controlling access to a protected location including a security controller having a processor, a memory coupled to the processor, a security token interface coupled to the processor, a network transceiver coupled to the processor, a secure access module coupled to the processor, an electromagnetic control circuit coupled to the processor and at least application installed in a portion of the memory having logical instructions executable by the processor to establish a secure communications connection over a network with an authentication server over a network via the network transceiver, perform an authentication transaction in conjunction with the authentication server for a critical security parameter received via the security token interface, receive and maintain a shared secret in the secure access module, incorporate the shared secret into the secure communications connection and energize the electromechanical control circuit upon receipt of an affirmative authentication result associated with the authentication transaction.

As before, the secure communications connection incorporates a security protocol including SSL, IPsec, PCT, TLS or RADIUS. Likewise, energizing the electromechanical control circuit opens a physical access gateway.

In another embodiment of the invention, the secure access module includes means for performing one or more life cycle management transactions in conjunction with either the authentication server or a life cycle management server, where the one or more life cycle management transactions comprises distributing, exchanging, deleting, adding or modifying one or more critical security parameters, applications or user data installed in the secure access module.

In a final systematic embodiment of the invention, the invention comprises a system for performing one or more life cycle management transactions with a secure access module coupled to a security controller and a life cycle management server. The system includes a secure access module operatively coupled to a security controller and provided with means for securely performing life cycle management functions in conjunction with a life cycle management server.

The security controller is provided with means for exchanging communications between the secure access module and the life cycle management server and the life cycle server is provided with means for securely performing one or more life cycle management transactions in conjunction with the secure access module. As before, the one or more life cycle management transactions comprises distributing, exchanging, deleting, adding or modifying one or more critical security parameters, applications or user data installed in the secure access module.

In an embodiment of the invention, the security controller and the life cycle server are in processing communications over a wireless telecommunications link.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined in the claims.

DETAILED DESCRIPTION

This present invention provides an integrated security system which seamlessly assimilates with current generation logical security systems. The integrated security system incorporates a security controller having standard network interface capabilities and takes advantage of the convenience and security offered by smart cards and related devices for both physical and logical security purposes. The invention is based on, but not limited to standard secure communications technologies known in the relevant art including secure socket layer (SSL), transport layer security (TLS), private communications technology (PCT, internet protocol security (IPsec) or remote authentication and dial in service (RADIUS) protocols.

The use of the standard secure communications technologies are supported by the IEEE 802.1x link layer, making these protocols well suited for secure when wireless communications networks such as 802.11a, 802.11b and 802.11g. Other arrangements which utilize wired or optical networks based on the WEE 802.22 standard are clearly supported as well.

Figure 1:
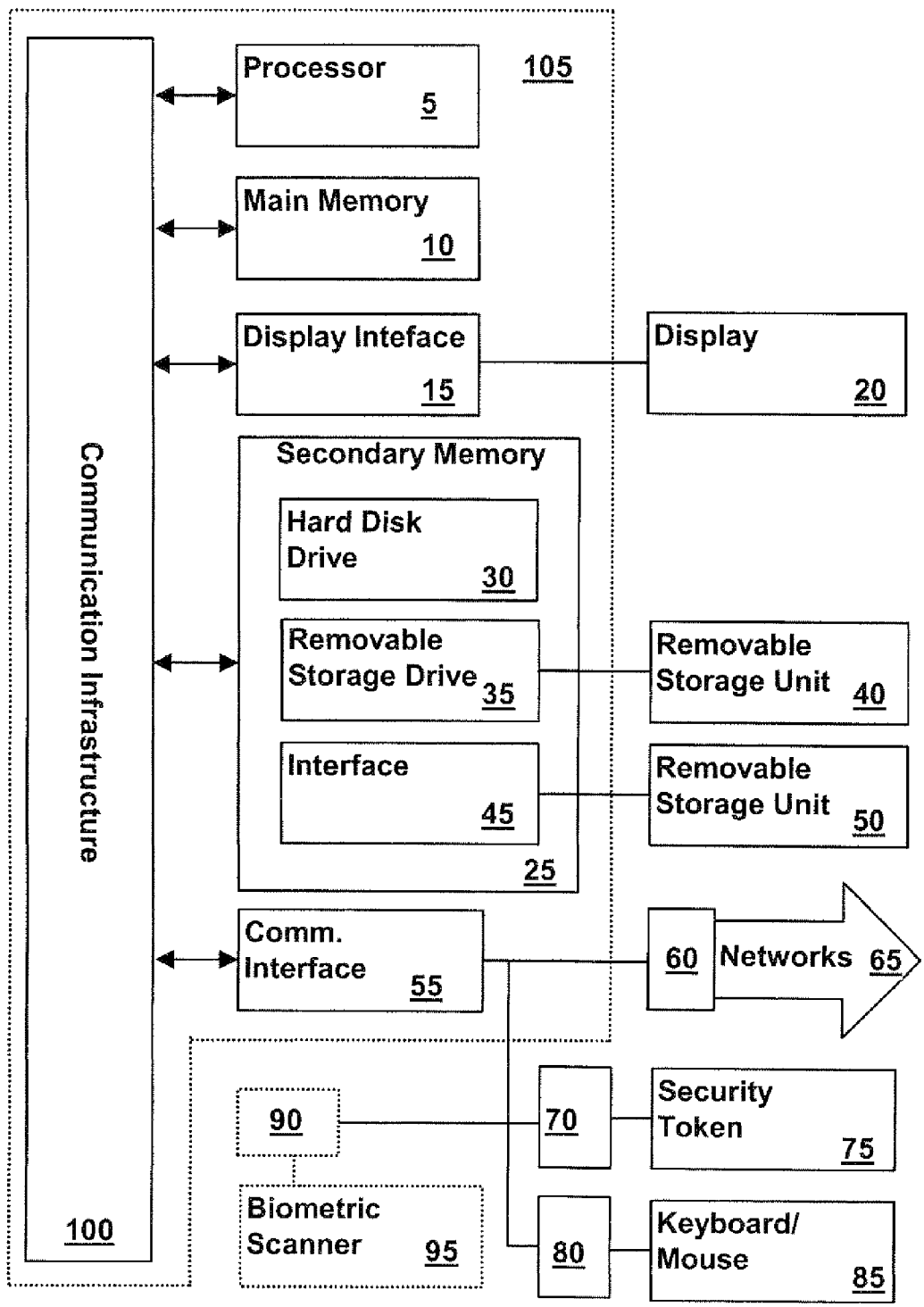
FIG. 1—is a generalized block diagram of a security token enabled authentication server.

Referring to FIG. 1, a block diagram of an authentication server 105 is depicted. The authentication server 105 includes a processor 5, a main memory 10, a display 20 electrically coupled to a display interface 15, a secondary memory subsystem 25 electrically coupled to a hard disk drive 30, a removable storage drive 35 electrically coupled to a removable storage unit 40 and an auxiliary removable storage interface 45 electrically coupled to an auxiliary removable storage unit 50.

A communications interface 55 subsystem is coupled to a network transceiver 60 and a network 65, an optional security token 75 such as a hardware security module (HSM) is electrically coupled to a security token interface 70 and a user input interface 80 including a mouse and a keyboard 85, and an optional biometric scanner 95 electrically coupled to an optional biometric scanner interface 90.

The processor 5, main memory 10, display interface 15 secondary memory subsystem 25 and communications interface system 55 are electrically coupled to a communications infrastructure 100. The authentication server 105 includes an operating system, authentication software, secure communications applications, other applications software, cryptography software capable of performing symmetric and asymmetric cryptographic functions, secure messaging software and device interface software.

One skilled in the art will appreciate that the tenet authentication server is intended to generically describe an authentication server which provides authorization and authentication information to a an IEEE 802.x network in which a user is attempting to connect or access, rather than being restricted to dialup or serial communications services. The basic arrangement of the authentication server 105 is also applicable to a life cycle management server shown in FIG. 2G.

Figure 1A:
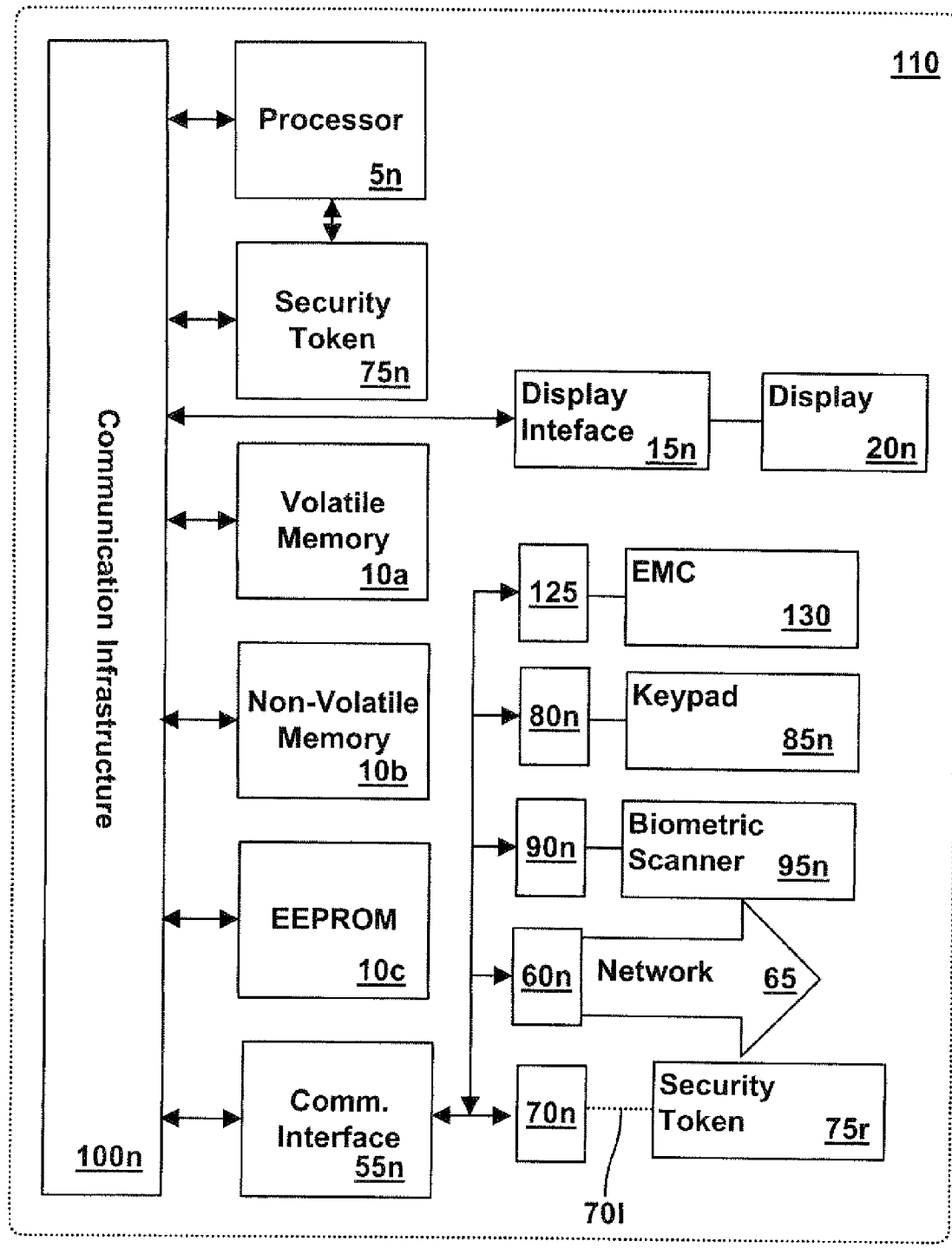
FIG. 1A—is a generalized block diagram of a security controller.

Referring to FIG. 1A, a block diagram of a security controller 110 is depicted. The security controller 110 includes a processor 5n, a security token 75n coupled to the processor 5n and a communications infrastructure 100n. The security token 75n is generally referred to as a secure access module (SAM). The security controller further includes a display 20n, such as an LCD screen and/or LEDs which is electrically coupled to a display interface 15n, volatile memory 10a, non-volatile memory 10h which includes flashable RAM, an electrically erasable programmable read only memory (EEPROM) 10c and a communications interface subsystem 55n.

The communications interface subsystem 55n is coupled to security token interface 70n and includes both contact and contactless connectability 70I with a removable security token 75r. The communications interface subsystem 55n is further coupled to a network transceiver 60n, a user input interface 80n including an optional keypad 85n, an optional biometric scanner 95n electrically coupled to an optional biometric scanner interface 90n and an electromechanical control circuit 130. The electromechanical control circuit 130 when energized allows physical access to a protected location. Examples of which include electromagnetically controlled door locks, door strikes, gates and turnstiles. The electromagnetic circuit is generally arranged to momentarily energize an electical solenoid to allow a person access into a controlled area.

The processor 5n, security token 75n, display interface 15n, volatile memory 10a, non-volatile memory 10b, EEPROM 10c and communications interface subsystem 55n are electrically coupled to a communications infrastructure 100n. The security controller includes an embedded operating environment, security applications compatible with those controlled by the authentication server 105, secure communications applications, other applications software, cryptography software capable of performing symmetric and asymmetric cryptographic functions, secure messaging software and device interface software. The secure access module 75n further includes at least one asymmetric key pair and related applications software to support secure key exchanges with the authentication server. The applications, cryptographic keys and any user data stored inside the security token 75r may be exchanged, modified, added or removed in a life cycle management transaction with either the authentication server 105 or a life cycle management server 105L shown in FIG. 2G.

Figure 1B:
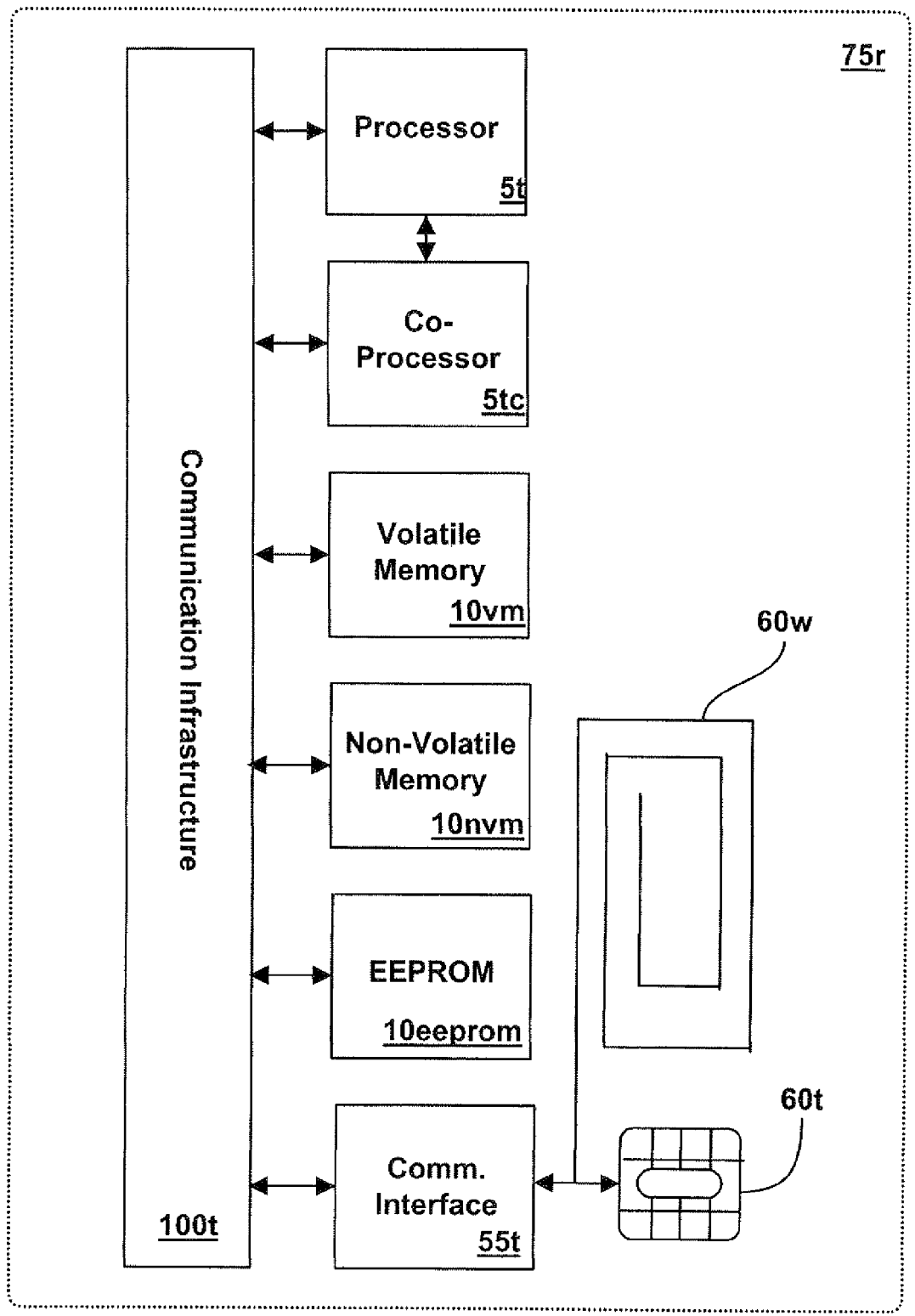
FIG. 1B—is a generalized block diagram of a security token.

Referring to FIG. 1B, a block diagram of the removable security token 75r is depicted. The security token 75r includes a wireless, optical and/or electrical interface 60t, 60w compatible with the security token interface 70n, a processor 5t, an optional cryptographic co-processor 5tc coupled to the processor 5t and a communications infrastructure 100t, volatile memory 10vm, non-volatile memory 10nvm, an electrically erasable programmable read only memory (EEPROM) 10eeprom and a communications interface 55t coupled to the interface 60t, 60w.

The processor 5t, optional cryptographic co-processor 5tc, volatile memory 10vm, non-volatile memory 10nvm, electrically erasable programmable read only memory (EEPROM) 10eeprom and communications interface 55t are electrically coupled to the communications infrastructure 100t. The EEPROM 10eeprom further includes a runtime operating environment, cryptography extensions incorporated into the operating system and capable of performing symmetric and asymmetric cryptographic functions compatible with the security controller and security token enabled cryptography software, at least one critical security parameter protected secure resource coupled to at least one token remote authentication application and a asymmetric public key infrastructure (PKI) key pair functionally coupled to the at least one token remote authentication application.

The non-volatile memory 10nvm has operatively stored therein one or more reference critical security parameters which are verified against a user supplied critical security parameter by the at least one token remote authentication application to allow access to the one or more one or more critical security parameter protected secure resources.

Figure 2:
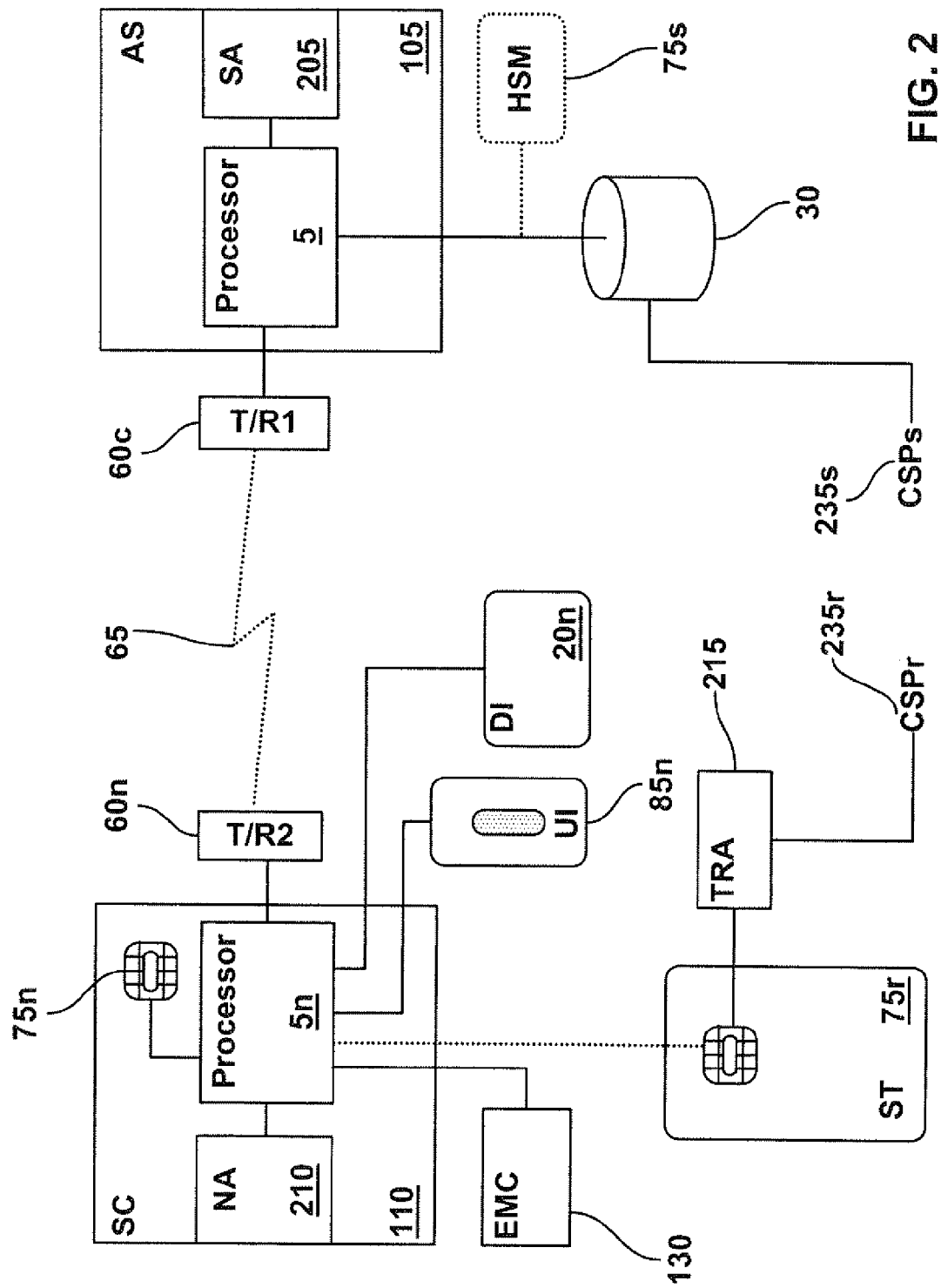
FIG. 2—is a detailed block diagram of one embodiment of the invention where a security token enabled authentication server is in processing communications with a security controller over a wireless telecommunications link.

Referring to FIG. 2, a generalized arrangement of the invention is depicted. The invention includes a security controller SC 110 in processing communications over a network 65 with an authentication server AS 105. A removable security token ST 75r is operatively coupled to the security controller SC 110.

The security controller SC 110 includes a processor 5n operatively coupled to a network transceiver T/R2 60n, a memory which includes at least one authentication transaction application NA 210, an electromechanical circuit which when energized allows physical access to a protected area, a secure access module (SAM) 75n for at least storing a shared secret required by a secure communications protocol, an optional user interface UI 85n and a display DI 20n. The user interface UI 85n and the display DI 20n are provided in situations having high security area requirements. For example, depending on the security requirements for physically accessing a protected area, an entity may be required to locally authenticate to the security token 75r by providing a biometric sample and/or a personal identification number (PIN) before transactions with authentication server AS 105 are performed.

The removable security token ST 75r such as a smart card is associated with the entity and operatively coupled to the security controller 110 via the contact or contactless interface 70n shown in FIG. 1A. The removable security token ST 75r includes at least one critical security parameter CSPr 235r which is retrievably stored inside the security token ST 75r.

The removable security token ST 75r includes at least one token remote access application operatively installed in token memory (not shown). The at least one token remote access application TRA 215 allows the security token ST 75r to send the critical security parameter CSPr 235r to the security controller SC 110 for authentication by the authentication server AS 105.

The authentication server AS 105 includes a server processor 5 coupled to a network transceiver T/R1 60c which is compatible with the network transceiver T/R2 60n installed on the security controller SC 110, a database 30 including a plurality of reference critical security parameters CSPs 235s required to authenticate critical security parameter received from the security controller SC 110. Alternately, the reference critical security parameters CSPs 235s may be operatively stored inside a hardware security module HSM 75s. A memory is coupled to the server processor 5 which includes at least one authentication transaction application. SA 205. The at least one authentication transaction application SA 205 allows the authentication server AS 105 to authenticate the critical security parameter CSPr 235 provided by the security token ST 75r.

The messaging protocol used to communicate with the security token ST 75r and secure access module 75n includes an ISO 7816 compliant communications protocol. Protocol conversion between higher level packet communications protocols and the lower level ISO 7816 communications protocol may be accomplished by either the remote access application SA 205 installed on the authentication server AS 105 or by the applications software NA 210 installed on the security controller SC 110.

A secure arrangement for exchanging APDU commands and responses between the security token ST 75r, security application module 75n and authentication server AS 105 is described in co-pending U.S. patent application Ser. No. 09/844,246, filed Apr. 9, 2002, entitled, "Method And System For Establishing A Remote Connection to A Personal Security Device," to a common assignee and is herein incorporated by reference in its entity.

Figure 2A:
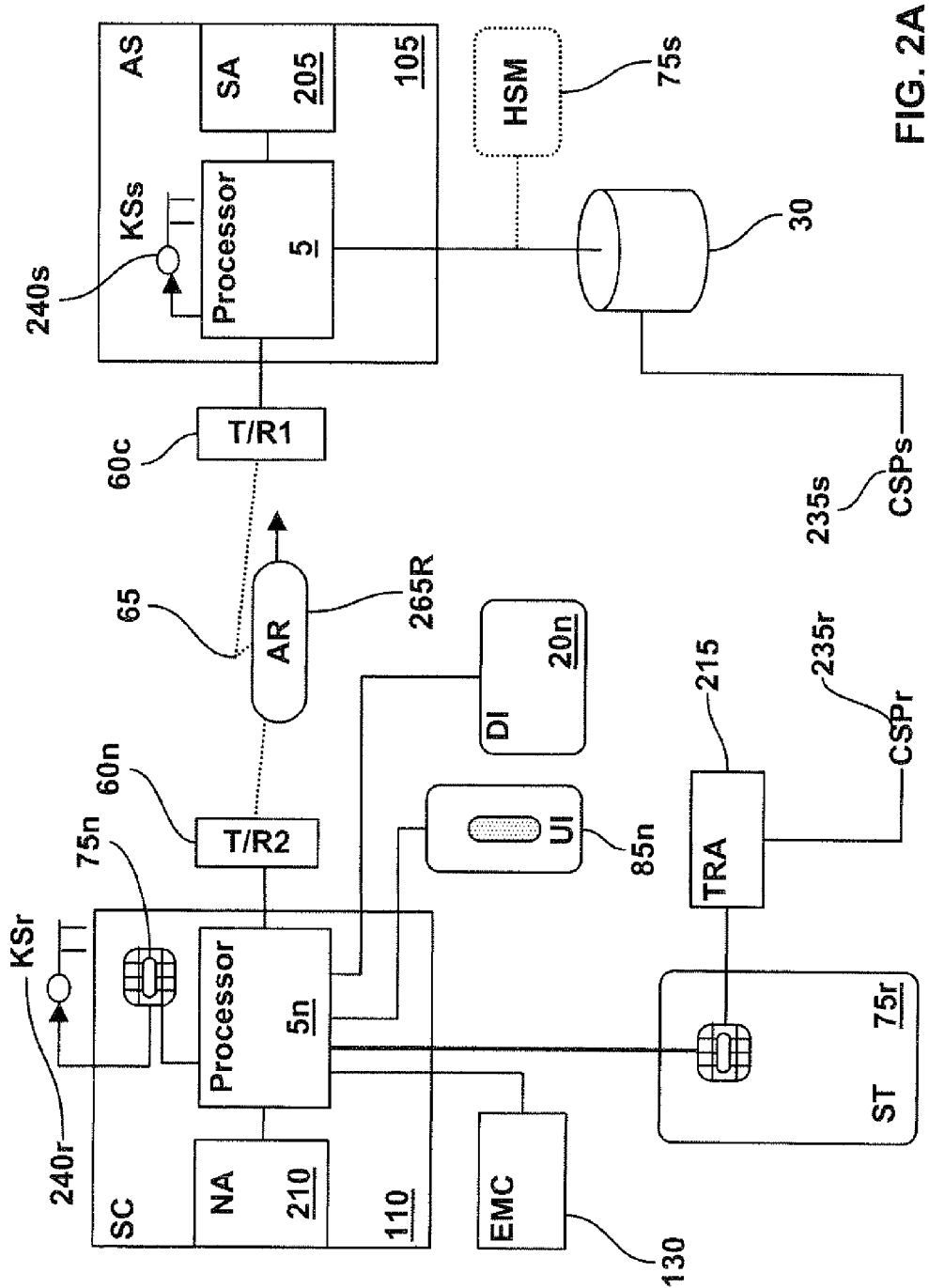
FIG. 2A—is a detailed block diagram of the invention where a shared secret is established between the authentication server and the security controller as part of the RADIUS authentication protocol.

Referring to FIG. 2A, physical access is initiated by an entity operatively coupling their security token ST 75r to the security controller SC 110. An access request AR 265R is generated and submitted by the security controller SC 110 to the authentication server AS 105 in accordance with an established authentication protocol. Attributes included in the access request AR 265R identify the entity's security token (usually a serial number) which may be verified against existing security policies established for the entity even before authentication is initiated (not shown) For example, if the entity is not permitted into the protected area in which access is being attempted, the transaction ends without further processing.

Discussions of security policies is described in co-pending U.S. patent applications Ser. No. 10/402,960 to a common assignee filed on Apr. 1, 2003, entitled "Uniform Framework for Security Tokens," and herein incorporated by reference in its entirety and co-pending U.S. patent application Ser. No. 10/425,028 to a common assignee filed on. Apr. 29, 2003, entitled "Uniform Modular Framework For A Host Computer System," and likewise herein incorporated by reference in its entirety.

As part of the established authentication protocol, if not already pre-exisiting, a shared secret KSr 240r, KSs 240s is generated by the authentication server AS 105, securely shared with the security controller and maintained by the secure access module 75n. The secure secret exchange is provided by the secure communications protocol being implemented over the network 65. However, more robust secure secret exchanges may be substituted as is necessary to meet a particular security requirement.

Figure 2B:
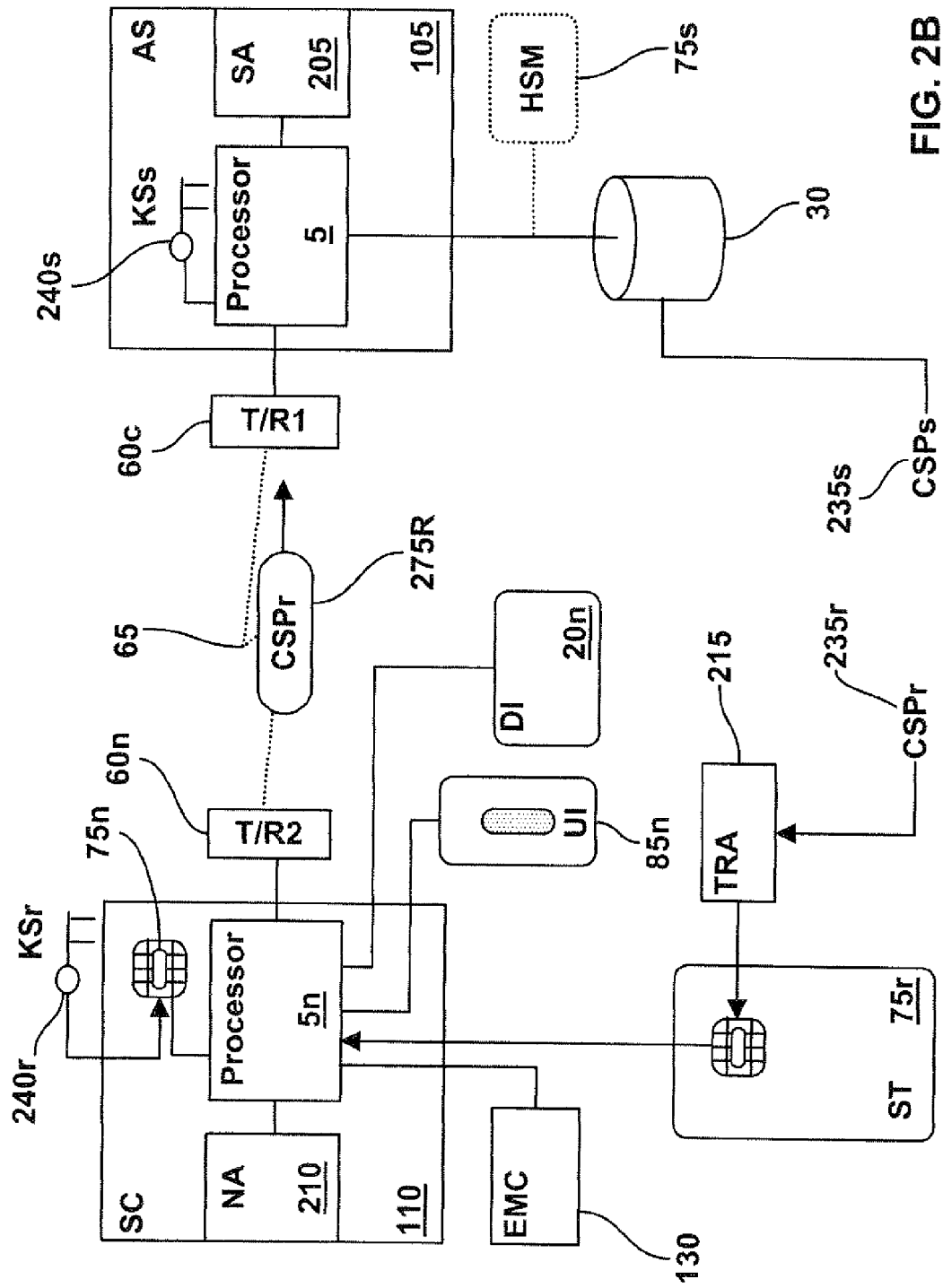
FIG. 2B—is a detailed block diagram of the invention where a critical security parameter is securely sent to the authentication server for authentication.

Referring to FIG. 2B, once the shared secrets KSr 240r, KSs 240s has been established for the secure communications connection between the authentication server AS 105 and the security controller SC 110, a critical security parameter CSPr 235r is retrieved from the entity's security token ST 75r, and securely sent 65 to the authentication server AS 105 for authentication.

Figure 2C:
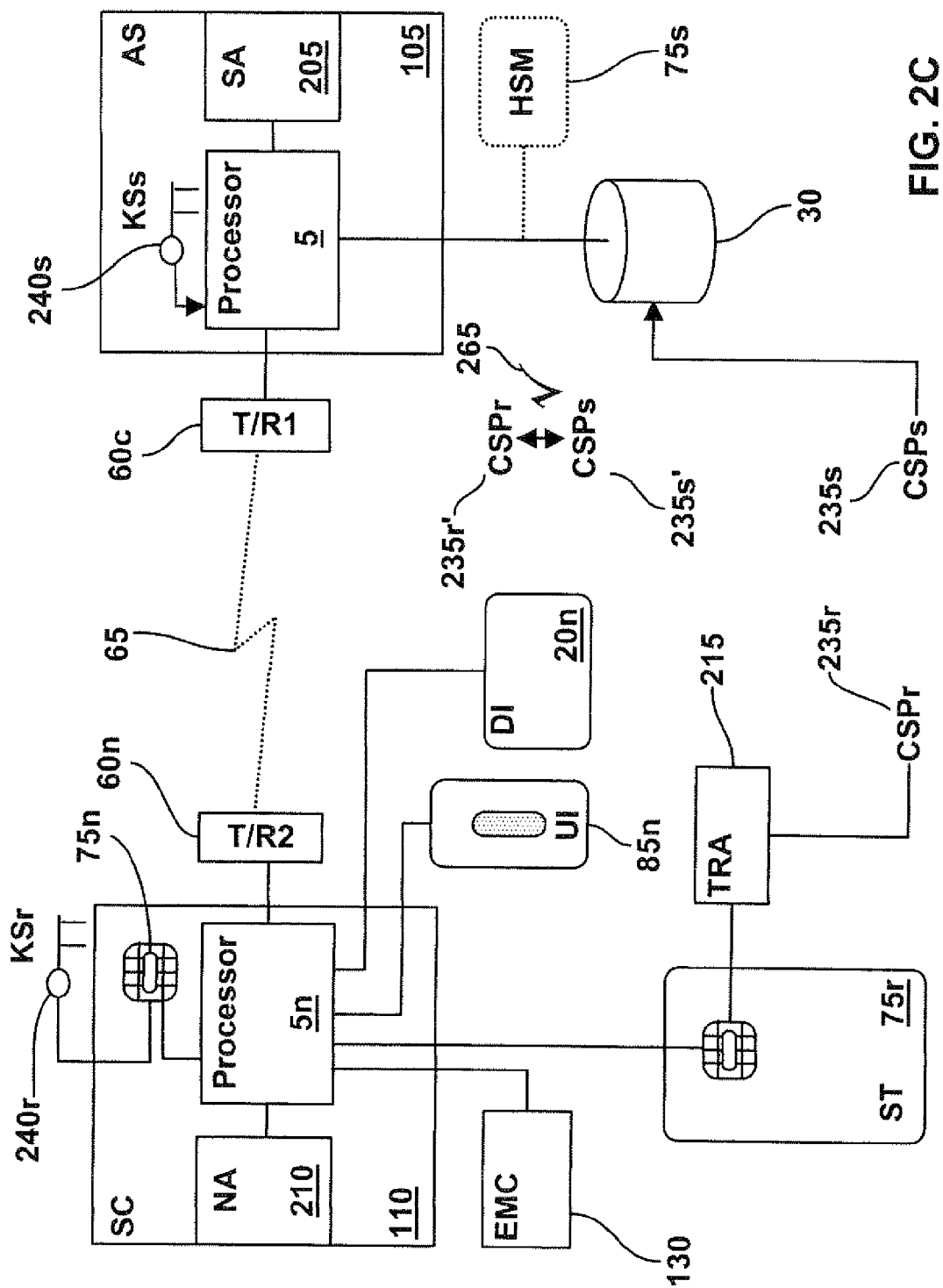
FIG. 2C—is a detailed block diagram of the invention where the authentication server performs an authentication transaction using the received critical security parameter.

Referring to FIG. 2C, upon receipt by the authentication server AS 105, the entity's critical security parameter CSPr 235r' is compared to a reference critical security parameter CSPs 235s' retrieved from the database 30 or HSM 75s. If the entity's critical security parameter CSPr 235r' is not authenticated, an authentication rejection message is sent to the security controller and the entity will not be permitted to access the protected area. If the entity's critical security parameter CSPr 235r' is successfully authenticated, an affirmative authentication result 265, shown as a check mark, is generated by the authentication server application SA 205.

Figure 2D:
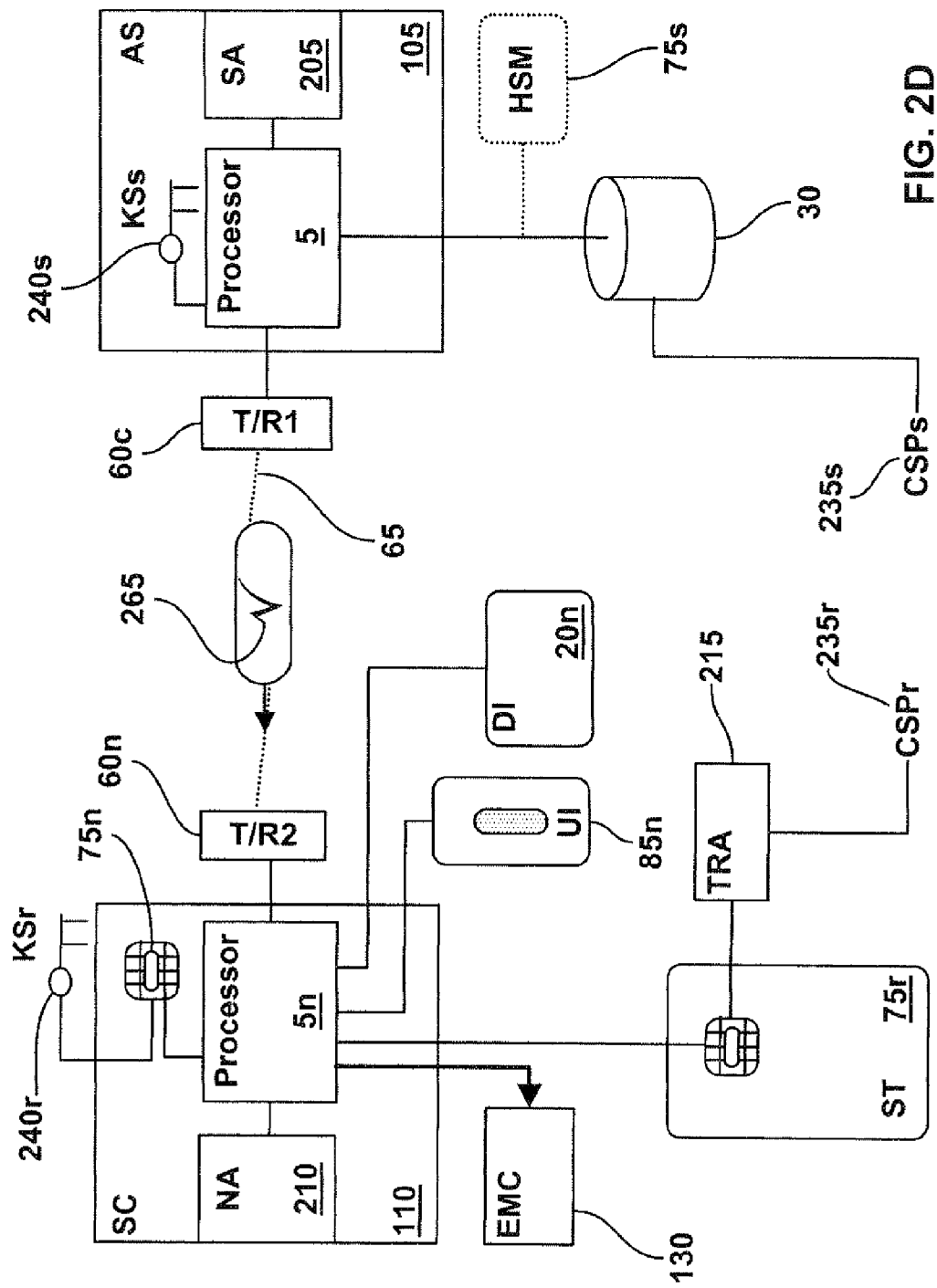
FIG. 2D—is a detailed block diagram of the invention where an affirmative result is generated from the authentication transaction and securely sent to the security controller.

Referring to FIG. 2D, the affirmative authentication result 265 is then securely sent to the security controller SC 110. The affirmative authentication result 265 is processed by the security controller application NA 210 resulting in energizing of the electromechanical control circuit EMC 130. The duration in which the electromechanical control circuit EMC 130 is energized may be specifically adjusted for a particular entity's security token. This allows for controlling the opening of a gateway such as a door to accommodate deliveries or allow physically disabled persons to transit the doorway.

Figure 2E:
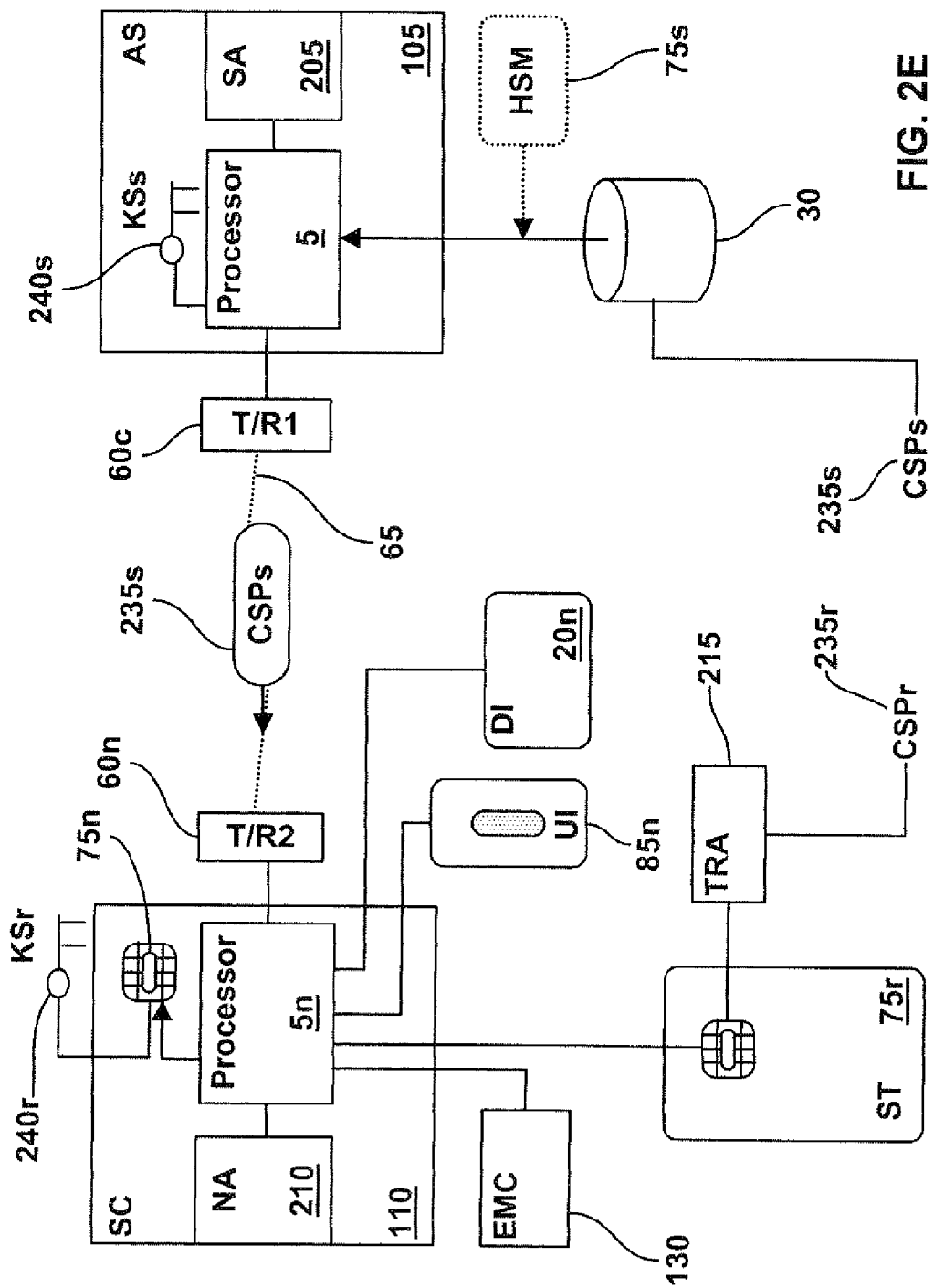
FIG. 2E—is a detailed block diagram of the invention where a life cycle management transaction is performed between the secure access module and the authentication server.

Referring to FIG. 2E, another embodiment of the invention is shown where a critical security parameter management transaction is performed between the authentication server AS 105 and the secure access module 75n.

In this embodiment of the invention, a secure communications connection 65 is established between at least the security controller SC 110 and the authentication server AS 105 using for example, the shared symmetric keys KSr, KSs 240r, 240s.

In an embodiment of the invention, the secure communications connection provides end-to-end secure communications between the secure access module 75*n* and the authentication server AS 105. It will be appreciated by one skilled in the art that other secure communications channel arrangements may be used as well.

In this example, a critical security parameter CSPs 235*s* is being securely sent for storage inside the secure access module 75*n*. The critical security parameter transaction may be a critical security parameter exchange, a critical security parameter replacement, a critical security parameter generation, a critical security parameter deletion or an attribute change to a cryptographic security parameter. The critical security parameter may be obtained from a datastore 30 or from a hardware security module HSM 75*s* operatively coupled to the authentication server.

Figure 2F:
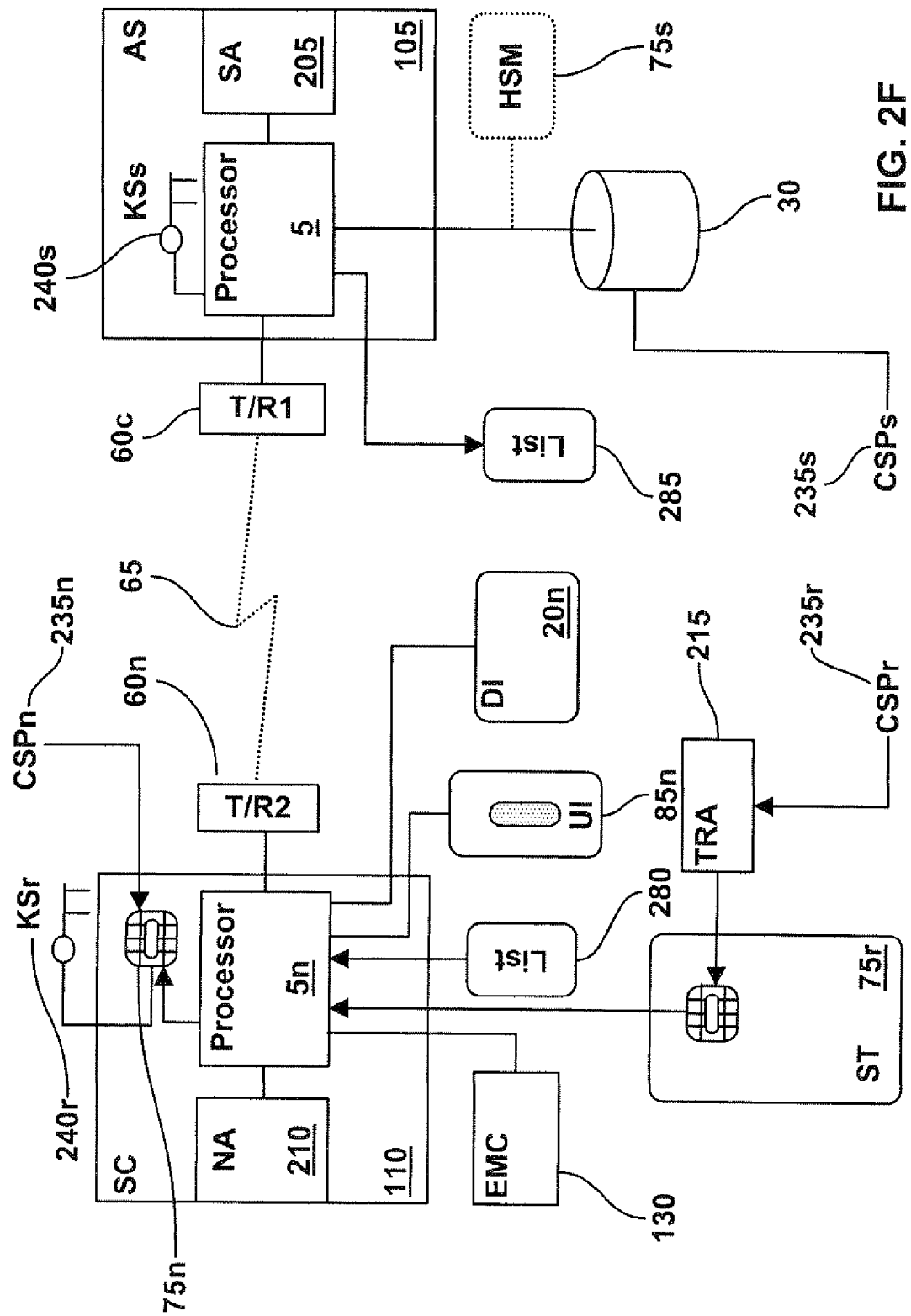
FIG. 2F—is a detailed block diagram of another embodiment of the invention where a critical security parameter is locally authenticated by a secure access module associated with a security controller.

Referring to FIG. 2F, an alternate embodiment of the invention is shown where the secure access module 75*n* coupled to the security controller SC 110 incorporates one or more critical security parameters CSPn 235*n* for locally authenticating a user. This arrangement allows a local access list 280 of authenticated users granted access to the protected area without having to rely on the authentication server AS 105 to perform the authentications which is particularly advantageous during high traffic periods such as at shift changes or during periods when either the authentication server AS 105 and/or the communications network 65 becomes temporarily unavailable. The local access list 280 of authenticated users or indicia of authorized users (e.g., token unique identifiers) is sent to the authentication server AS 105 when the local access list 280 becomes full, when requested by the authentication server AS 105 and/or communications with the authentication server AS 105 is restored.

The local access list 280 is sent to the authentication server AS 105 via the secure communications mechanisms described above. This arrangement allows full CSP management including key management functions and updating of authorized access lists over standard IEEE 802.x network arrangements. The local access list is then used by the authentication server AS 105 to update a master access list 285.

Figure 2G:
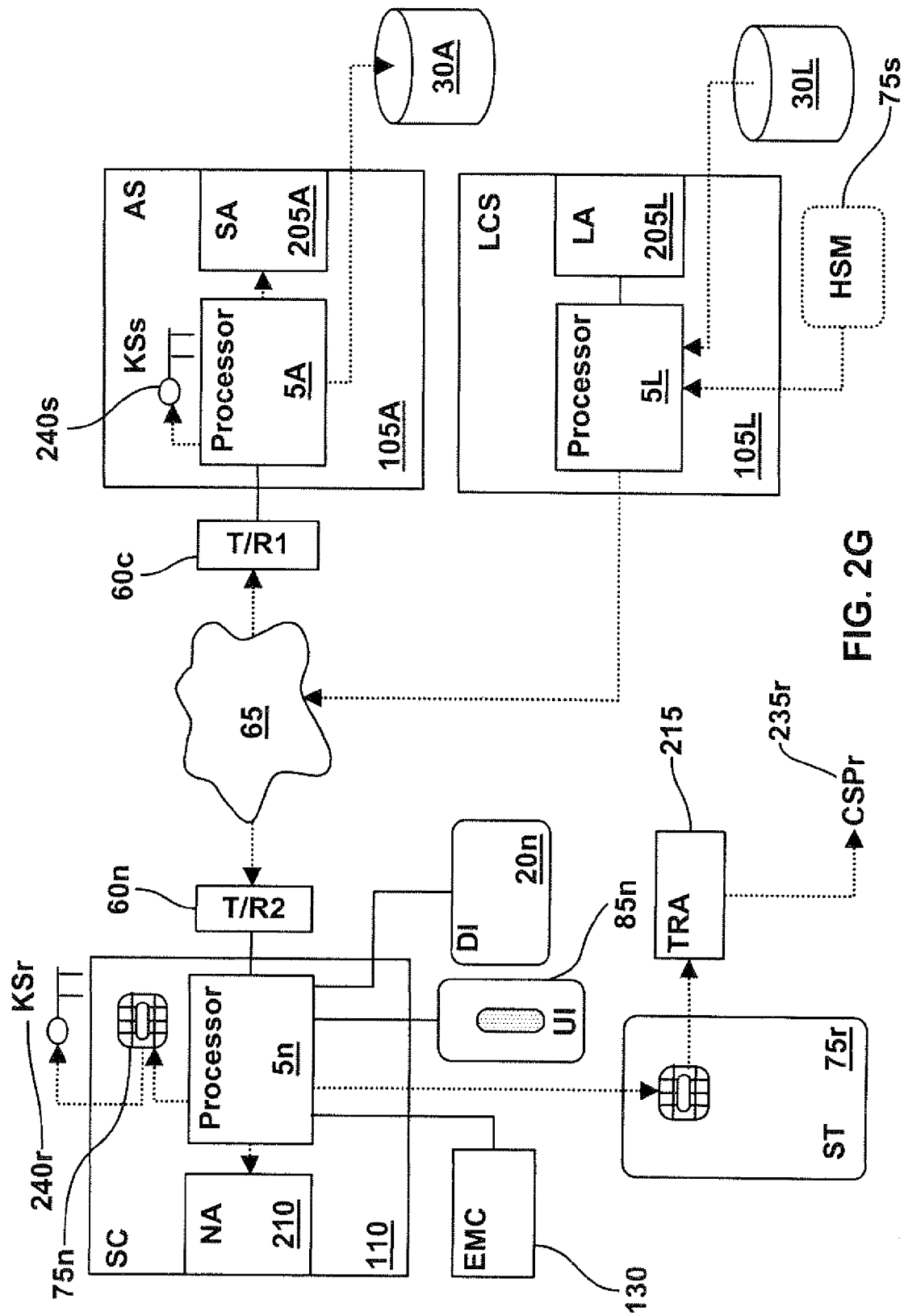
FIG. 2G—is a detailed block diagram of another embodiment of the invention where one or more life cycle management transactions are performed between a life cycle management server, the authentication server, the secure access module and the security token.

Referring to FIG. 2G, an another embodiment of the invention is shown where a lifecycle management server LCS 105L is operatively coupled to the network 65. In this embodiment of the invention, the life cycle management server LCS 105L maintains the security applications and cryptographic information employed by the authentication server AS 105A the security controller SC 110, secure access module 75*n* and optionally the security token ST 75*r*. This arrangement allows the life cycle management server LCS 105L to distribute, exchange, delete, add or modify one or more critical security parameters, applications or user data installed in these devices.

Figure 3:
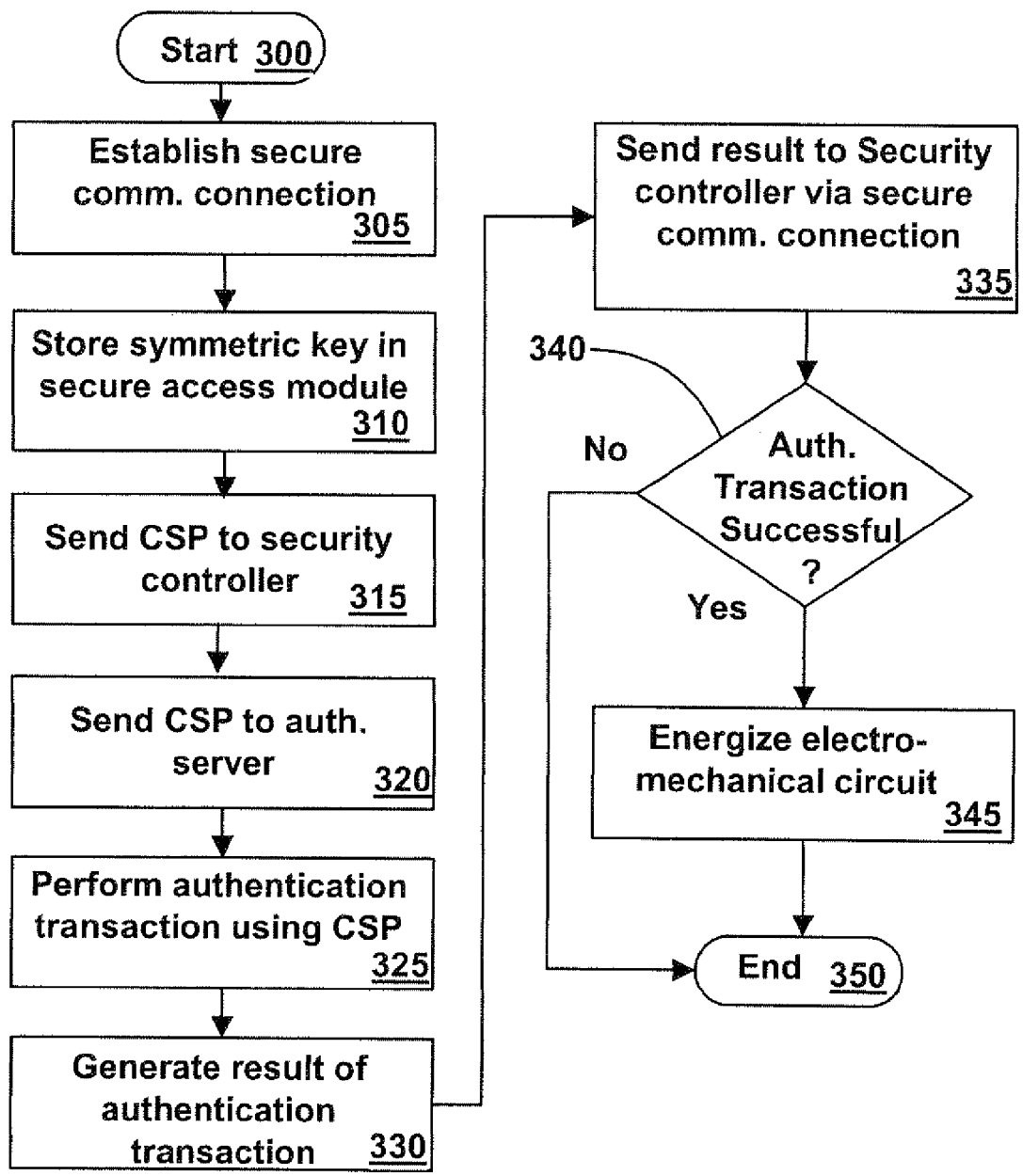
FIG. 3—is a flow diagram illustrating the major steps associated with physically controlling access to a protected location using the invention.

Referring to FIG. 3, the major steps for implementing the invention are depicted. The process is initiated 300 by establishing a secure communications connection which incorporates a shared symmetric key between an security controller and a authentication server 305. The symmetric is securely stored and maintained by a secure access module associated with the security controller 310. A critical security parameter is then sent from an entity's security token to the security controller 310. The security controller sends the critical security parameter to the authentication server via the secure communications connection 320 for authentication.

The authentication server performs an authentication transaction using the entity's critical security parameter 325 and generates a result of the authentication transaction 330. The result of the authentication transaction is then sent to the security controller via the secure communications connection for evaluation 335. If the entity's critical security parameter is not successfully authenticated 340, processing ends 350 and the entity will not be permitted to access the protected area. If the entity's critical security parameter is successfully authenticated 340, an electromechanical circuit is energized 345 which permit the entity physical access to the protected are for a pre-established duration, followed by access and processing termination 350.

Figure 3A:
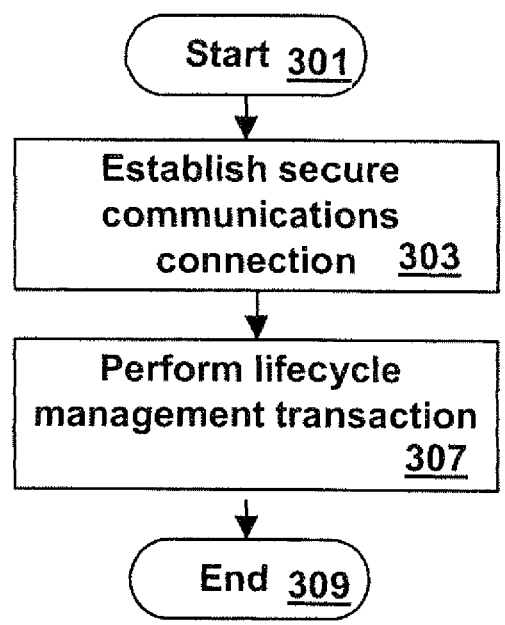
FIG. 3A—is a flow diagram illustrating the major steps associated with performing a critical security parameter management transaction between the secure access module and the authentication server.

Referring to FIG. 3A, the major steps for implementing an alternate embodiment of the invention is depicted. The process is initiated 301 by establishing a secure communications channel between at least a secure controller but preferably between a secure access module coupled to the security controller and the authentication server 303.

The authentication server then conducts at least one life cycle management transaction in conjunction with the secure access module 307. Once the life cycle management transaction has been completed, processing ends 309. One skilled in the art will appreciate that additional life cycle management transactions may be conducted with an operatively coupled security token as well.

Figure 3B:
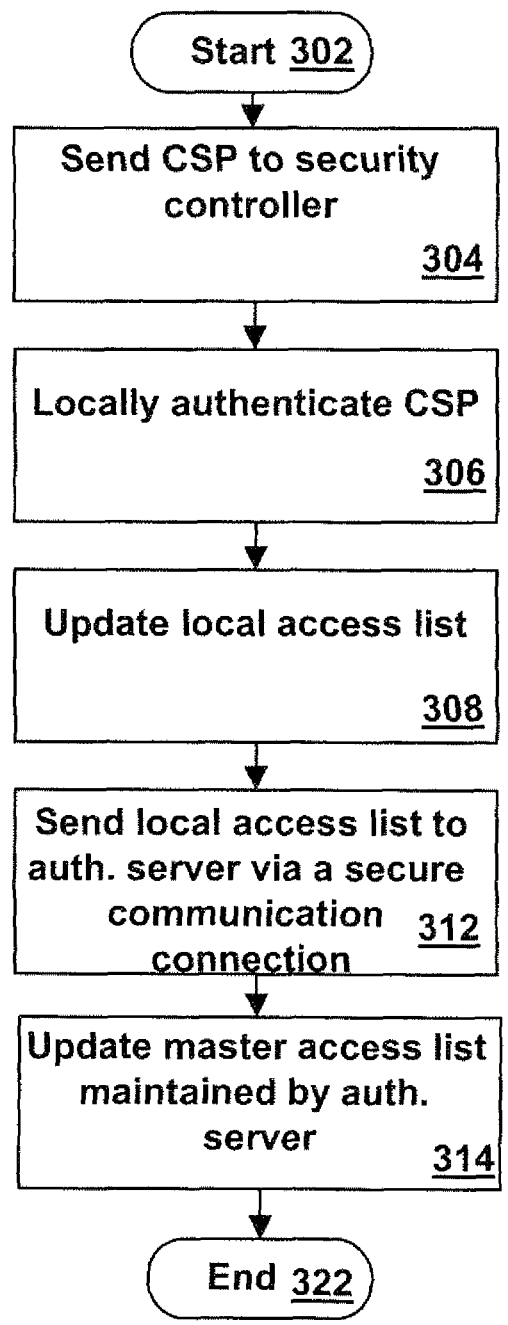
FIG. 3B—is a flow diagram illustrating the major steps associated with locally performing a critical security parameter authentication and sending an access list to the authentication server.

Lastly, Referring to FIG. 3B, the major steps for implementing another embodiment of the invention is depicted. In this embodiment of the invention, the process is initiated 302 by sending a critical security parameter (CSP) from a security token associated with an entity to a security controller equipped with a secure access module 304. The secure access module attempts to locally authenticate the CSP 306, the result of which is then recorded in a local access list 308. The local access list is then sent to an authentication server via a secure communications connection 312 where a master access list is updated using the information included in the local access list 314. The process ends after the master access list has been updated 322.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security token operating environment. Other variations and embodiments are possible in light of above teachings, and it is not intended that this Detailed Description limit the scope of invention, but rather by the Claims following herein.

What is claimed:

1. A method for physically controlling access to a protected location, comprising:

establishing a secure communications connection over a network between a security controller and an authentication server;

operatively coupling a security token to the security controller;

providing a critical security parameter to the security controller for authentication after using a token remote authentication application on the security token to verify the critical security parameter against one or more reference critical security parameters;

sending the critical security parameter to the authentication server via the secure communications connection;

performing an authentication transaction at the authentication server for the critical security parameter;

sending a result of the authentication transaction from the authentication server to the security controller via one of: the secure communications connection or the security token; and energizing an electromechanical circuit coupled to and controlled by the security controller if the result of the authentication transaction is successful.

2. The method according to claim 1 wherein the security controller and electromechanical circuit are in one integral unit.

3. The method according to claim 1 wherein the secure communications connection includes a shared secret established between the security controller and the authentication server which is securely maintained by a secure access module operatively coupled to the security controller.

4. The method according to claim 1 wherein the security controller is one of a plurality of security controllers, wherein the plurality of security controllers are networked clients of the authentication server.

5. The method according to claim 1 wherein at least a portion of the secure communications connection is established over a wireless telecommunications link.

6. The method according to claim 1 wherein the secure communications connection incorporates a security protocol including SSL, IPsec, PCT, TLS or RADIUS.

7. The method according to claim 1 wherein the security controller is in secure communications over the network with a life cycle management server.

8. The method according to claim 7 wherein the life cycle management server is adapted to perform life cycle management functions related to applications, critical security parameters or user data installed in either the security token or the secure access module.

9. The method according to claim 1 wherein the critical security parameter is provided by the user and the one or more reference critical security parameters are operatively stored on the security token.

10. The method according to claim 1 wherein the secure communications connection incorporates a shared secret which is maintained by the authentication server and the security controller.

11. A system for physically controlling access to a protected location, comprising:
an authentication server;
a security controller that establishes the secure communications connection with the authentication server;
a security token operatively coupled to the security controller, the security token sending a critical security parameter to the security controller for authentication after using a token remote authentication application on the security token to verify a user supplied critical security parameter against one or more reference critical security parameters; and
an electromechanical circuit that is coupled to and controlled by the security controller and that opens a physical access gateway when energized, wherein the security controller sends the critical security parameter to the authentication server via the secure communications connection and energizes the electromechanical circuit in response to an affirmative authentication result received from the authentication server.

12. The system according to claim 11 wherein the security controller and electromechanical circuit are in one integral unit.

13. The system according to claim 11 wherein the secure communications connection includes a shared secret established between the security controller and the authentication server which is securely maintained by a secure access module operatively coupled to the security controller.

14. The system according to claim 11 wherein the security controller is one of a plurality of security controllers, wherein the plurality of security controllers are networked clients of the authentication server.

15. The system according to claim 11 wherein at least a portion of the secure communications connection is established over a wireless telecommunications link.

16. The system according to claim 11 wherein the secure communications connection incorporates a security protocol including SSL, IPsec, PCT, TLS or RADIUS.

17. The system according to claim 11 wherein the security controller is in secure communications over the network with a life cycle management server.

18. The system according to claim 17 wherein the life cycle management server is adapted to perform life cycle management functions related to applications, critical security parameters or user data installed in either the security token or the secure access module.

19. The method according to claim 11 wherein the critical security parameter is provided by the user and the one or more reference critical security parameters are operatively stored on the security token.

20. The method according to claim 11 wherein the secure communications connection incorporates a shared secret which is maintained by the authentication server and the security controller.

* * * * *